(12) United States Patent
Shi et al.

(10) Patent No.: US 11,825,871 B2
(45) Date of Patent: Nov. 28, 2023

(54) METHOD AND DEVICE FOR DETECTING PLASTIC FOREIGN OBJECTS WITH LOW CHROMATICITY DIFFERENCE IN SHREDDED TOBACCO THROUGH ONLINE PULSE SPECTRAL IMAGING

(71) Applicant: Jiangsu University, Suzhou (CN)

(72) Inventors: Jiyong Shi, Jiangsu (CN); Yueying Wang, Jiangsu (CN); Xiaobo Zou, Jiangsu (CN); Xiaowei Huang, Jiangsu (CN); Zhihua Li, Jiangsu (CN); Zhiming Guo, Jiangsu (CN); Tingting Shen, Jiangsu (CN); Xinai Zhang, Jiangsu (CN); Di Zhang, Jiangsu (CN); Jing Liang, Jiangsu (CN)

(73) Assignee: Jiangsu University, Jiangsu (CN)

( * ) Notice: Subject to any disclaimer, the term of this patent is extended or adjusted under 35 U.S.C. 154(b) by 148 days.

(21) Appl. No.: 17/620,074

(22) PCT Filed: Nov. 5, 2021

(86) PCT No.: PCT/CN2021/128859
§ 371 (c)(1),
(2) Date: Dec. 16, 2021

(87) PCT Pub. No.: WO2023/070724
PCT Pub. Date: May 4, 2023

(65) Prior Publication Data
US 2023/0128801 A1    Apr. 27, 2023

(30) Foreign Application Priority Data
Oct. 27, 2021 (CN) .......................... 202111255399.4

(51) Int. Cl.
*A24C 5/39* (2006.01)
*G01N 21/892* (2006.01)
(Continued)

(52) U.S. Cl.
CPC ............. *A24C 5/396* (2013.01); *G01N 21/63* (2013.01); *G01N 21/892* (2013.01); *G01N 21/94* (2013.01);
(Continued)

(58) Field of Classification Search
CPC .................. A24C 5/396; A24C 5/3412; G01N 2021/8466; G01N 2021/8925;
(Continued)

(56) References Cited

U.S. PATENT DOCUMENTS

| | | |
|---|---|---|
| 4,609,108 A | 9/1986 | Hristozov et al. |
| 5,476,108 A * | 12/1995 | Dominguez ......... A24C 5/3412 131/108 |

FOREIGN PATENT DOCUMENTS

| | | |
|---|---|---|
| CN | 105911068 | 8/2016 |
| CN | 107296297 | 10/2017 |

(Continued)

OTHER PUBLICATIONS

"Written Opinion of the International Searching Authority (Form PCT/ISA/237) of PCT/CN2021/128859", dated Feb. 25, 2022, with English translation thereof, pp. 1-8.

*Primary Examiner* — Tri T Ton
(74) *Attorney, Agent, or Firm* — JCIP GLOBAL INC.

(57) ABSTRACT

A method and a device for detecting plastic foreign objects with low chromaticity difference in shredded tobacco through online pulse spectral imaging are provided. The method includes three steps: negative pressure thin-layer loading of shredded tobacco, pulse line-scanning identification of shredded tobacco, and positive pressure online elimination of foreign objects. Loose shredded tobacco is formed into a fixed and continuous thin layer on a surface of a conveying cylinder under the effect of a negative pressure adsorption force. The surface of the conveying cylinder is
(Continued)

coded by areas. An LED linear array light source containing characteristic wavelengths of plastics with low chromaticity difference emits optical pulses, and a line-scanning camera is used to obtain characteristic signals of the plastic foreign objects with low chromaticity difference efficiently in real time.

10 Claims, 7 Drawing Sheets

(51) Int. Cl.
 *G01N 21/63* (2006.01)
 *G01N 21/94* (2006.01)
 *G01N 21/84* (2006.01)
(52) U.S. Cl.
 CPC ............. *G01N 2021/8466* (2013.01); *G01N 2021/8925* (2013.01); *G01N 2201/0626* (2013.01)

(58) Field of Classification Search
 CPC ...... G01N 21/63; G01N 21/892; G01N 21/94; G01N 2021/3181; G01N 2021/8592; G01N 21/31; G01N 21/85; G01N 2201/0626
 See application file for complete search history.

(56) References Cited

FOREIGN PATENT DOCUMENTS

| | | |
|---|---|---|
| CN | 107330882 | 11/2017 |
| CN | 111871812 | 11/2020 |
| CN | 212059973 | 12/2020 |
| CN | 112189877 | 1/2021 |
| JP | 2000028544 | 1/2000 |

* cited by examiner

METHOD AND DEVICE FOR DETECTING PLASTIC FOREIGN OBJECTS WITH LOW CHROMATICITY DIFFERENCE IN SHREDDED TOBACCO THROUGH ONLINE PULSE SPECTRAL IMAGING

CROSS-REFERENCE TO RELATED APPLICATION

This application is a 371 of international application of PCT application serial no. PCT/CN2021/128859, filed on May 11, 2021 which claims the priority benefit of China application no. 202111255399.4, filed on Oct. 27, 2021. The entirety of each of the above mentioned patent applications is hereby incorporated by reference herein and made a part of this specification.

TECHNICAL FIELD

The present invention relates to the technical field of foreign object detection in shredded tobacco, and in particular, to a method and a device for detecting plastic foreign objects with low chromaticity difference in shredded tobacco through online pulse spectral imaging.

DESCRIPTION OF RELATED ART

The production of shredded tobacco involves harvesting, storage and transportation, processing, and the like of tobacco leaves. Various types of foreign objects may easily get in and affect the quality of shredded tobacco products. Different from visible physical hazards to teeth, oral cavity, and esophagus after intake of foreign objects in conventional food, plastic foreign objects featuring low ignition points in shredded tobacco can burn with the shredded tobacco and produce irritating and even toxic and harmful gases, which causes invisible chemical hazards to consumers and seriously affects their sensory experience. "Zero tolerance" should be taken against plastic foreign objects in cigarette production. Therefore, the detection of plastic foreign objects in shredded tobacco is one of the key points in the quality control of cigarettes.

Methods for detecting foreign objects based on computer vision, X-rays, magnetic fields, and so on have been proposed according to differences in color, density, magnetizability, and the like between foreign objects and food. Patent No. CN107330882A discloses a method for detecting foreign objects in shredded tobacco based on computer vision. The method detects foreign objects in shredded tobacco by using a preset foreign object discriminator to analyze differences in appearance between the foreign objects and the shredded tobacco. Patent publication No. CN212059973U discloses a method for detecting foreign objects in food based on X-rays. The method detects metal and other foreign objects with high density difference according to different propagation behaviors of X-rays in media of different densities. Patent publication No. CN111871812A discloses a method for detecting foreign objects in shredded tobacco based on a magnetic field. The method detects and sorts out metal foreign objects in shredded tobacco by using a metal detector to sense the magnetizable metal foreign objects in the shredded tobacco. However, it is difficult to effectively detect plastic foreign objects with low chromaticity difference by using the existing methods because such plastic foreign objects are characterized by high transparency, insignificant differences from shredded tobacco in terms of color, density, and magnetizability, and so on.

To eliminate the defects in the existing technical solutions, since plastic foreign objects with low chromaticity difference are different from shredded tobacco in chemical composition, the present invention accurately and rapidly captures optical characteristics of the plastics with low chromaticity difference by using an online spectral imaging technology and analyzes their differences in chemical composition, thereby efficiently identifying and eliminating the plastic foreign objects with low chromaticity difference in shredded tobacco.

SUMMARY

An objective of the present application is to provide a method and a device for detecting plastic foreign objects with low chromaticity difference in shredded tobacco through online pulse spectral imaging, thereby solving the problem in the prior art that it is difficult to identify and eliminate plastic foreign objects with low chromaticity difference in shredded tobacco.

Firstly, the present invention provides a method for detecting plastic foreign objects with low chromaticity difference in shredded tobacco through online pulse spectral imaging. The method comprises three steps, that is, negative pressure thin-layer loading of shredded tobacco, pulse line-scanning identification of shredded tobacco, and positive pressure online elimination of foreign objects.

Step 1: The negative pressure thin-layer loading of shredded tobacco comprises the following processes:

A first process, wherein shredded tobacco falls from a hopper onto a horizontal conveyor belt, and when the shredded tobacco is conveyed by the horizontal conveyor belt to pass below a thin-layer thickness adjustment roller, the shredded tobacco exceeding a set thickness is removed by the thin-layer thickness adjustment roller to a shredded tobacco elimination roller and is then taken away by the shredded tobacco elimination roller into a super-thick shredded tobacco collection hopper.

A second process, wherein the shredded tobacco adjusted by the thin-layer thickness adjustment roller is continuously conveyed by the horizontal conveyor belt and falls from a far end of the horizontal conveyor belt onto a surface of a conveying cylinder. Meanwhile, a negative pressure control solenoid valve connected to air chambers below the surface of the conveying cylinder is opened, and the shredded tobacco is adsorbed on the surface of the conveying cylinder under a negative pressure produced by airflows from outside into air holes of an air hole array on an outer layer of the conveying cylinder.

A third process, wherein loose shredded tobacco on the surface of a thin layer of shredded tobacco adsorbed by the negative pressure to the surface of the conveying cylinder is blown into a loose shredded tobacco collection hopper by airflows from nozzles in an airflow nozzle array, the airflows being tangential to the surface of the conveying cylinder, and a stable thin layer of the remaining shredded tobacco is formed on the surface of the conveying cylinder.

Step 2: The pulse line-scanning identification of shredded tobacco comprises the following processes:

A first process, wherein the surface of the conveying cylinder with a width of W and a circumference of L is coded, where the surface of the conveying cylinder is divided into P rectangular strips, each of the rectangular strips having a width of W and a length of L/P and being marked as A_j. The rectangular strip A_j is divided into Q square unit areas, each of the square unit areas having a side length of L/P and being marked as A_j_k. The surface of the conveying cylinder is coded with a coding array C containing Q rows and P columns and having an initial value of 0, where a coding rule is that C(k, j) is corresponding to the square unit area A_j_k, P and Q are positive integers, j is in a range of 1, 2, . . . , P−1, P, and k is in a range of 1, 2, . . . , Q−1, Q.

Wherein, u air holes are arranged below each of the square unit areas A_j_k, and the u air holes are corresponding to one air chamber, where u is a positive integer. A position trigger and an industrial computer are used to determine a corresponding position of the rectangular strip A_j on the conveying cylinder at different time.

A second process, wherein the conveying cylinder keeps rotating at a constant speed, a line-scanning area with a width of W is determined on the surface of the conveying cylinder, and a light-emitting diode (LED) linear array light source containing N characteristic wavelengths of plastics with low chromaticity difference is used together with a line-scanning camera to capture an image of the thin layer of shredded tobacco in the line-scanning area. The LED linear array light source corresponding to each of the characteristic wavelengths sequentially and cyclically emits light with a pulse width of T/N, a pulse interval of T(N−1)/N, and a pulse period of T in an imaging process. When the rectangular strip A_j passes through the line-scanning area, the line-scanning camera obtains in real time a scanning signal I_band_j_i corresponding to the rectangular strip A_j under irradiation of an $i^{th}$ characteristic wavelength $\lambda$_i, where i is in a range of 1, 2, . . . , N−1, N and N is a positive integer. The pulse period T is in a range of 1.5-3000 μs.

A third process, wherein foreign object discrimination thresholds D_i of scanning signals corresponding to the N characteristic wavelengths $\lambda$_i are used together with the scanning signal I_band_j_i obtained in real time and corresponding to the rectangular strip A_j under irradiation of the $i^{th}$ characteristic wavelength to identify whether foreign objects exist in the area corresponding to the rectangular strip A_j. If an identification result is that foreign objects do not exist in the area corresponding to the rectangular strip A_j, values of elements C(1:Q, j) in a $j^{th}$ column of the coding array C remain unchanged. If an identification result is that foreign objects exist in the area corresponding to the rectangular strip A_j, the square unit area A_j_k containing the foreign objects in the rectangular strip A_j is further located, and the corresponding C(k, j) in the coding array C is set to 1.

Step 3: The positive pressure online elimination of foreign objects comprises the following processes:

A first process, wherein a foreign object-containing shredded tobacco elimination trigger line is set directly above a foreign object collection container. When the area corresponding to the rectangular strip A_j is directly above the foreign object collection container and a center line of the area coincides with the foreign object-containing shredded tobacco elimination trigger line, the position trigger transmits a signal to the industrial computer, and meanwhile the industrial computer reads the elements C(1:Q, j) corresponding to the rectangular strip A_j in the coding array and sequentially reads the values of all the elements C(k, j) in C(1:Q, j). If C(k, j) is 0, foreign objects do not exist in the square unit area A_j_k corresponding to C(k, j), therefore, the air chamber corresponding to the air holes in the square unit area A_j_k maintains an original state, and the thin layer of shredded tobacco in the square unit area remains adsorbed by the negative pressure. If C(k, j) is 1, foreign objects exist in the square unit area A_j_k corresponding to C(k, j), therefore, the negative pressure control solenoid valve connected to the air chamber corresponding to the air holes in the square unit area A_j_k is closed and a first positive pressure control solenoid valve also connected to the air chamber is opened for t1 seconds and then closed, so that the air chamber corresponding to the air holes in the square unit area A_j_k is in a positive pressure P1 state for t1 seconds and then in a normal pressure P0 state, and the thin layer of shredded tobacco containing foreign objects falls from the square unit area A_j_k into the foreign object collection container.

A second process, wherein a qualified shredded tobacco unloading trigger line is set directly above a qualified shredded tobacco collection container. When the area corresponding to the rectangular strip A_j is directly above the qualified shredded tobacco collection container and a center line of the area coincides with the qualified shredded tobacco unloading trigger line, the position trigger transmits a signal to the industrial computer, and meanwhile the industrial computer reads the elements C(1:Q, j) corresponding to the rectangular strip A_j in the coding array and sequentially reads the values of all the elements in C(1:Q, j). If C(k, j) is 0, the thin layer of shredded tobacco in the square unit area A_j_k corresponding to C(k, j) is qualified, the negative pressure control solenoid valve connected to the air chamber corresponding to the air holes in the square unit area A_j_k is closed, and the first positive pressure control solenoid valve also connected to the air chamber is opened for t1 seconds and then closed, so that the air chamber corresponding to the air holes in the square unit area A_j_k is in the positive pressure P1 state for t1 seconds and then in the normal pressure P0 state, and the qualified thin layer of shredded tobacco falls from the square unit area A_j_k into the qualified shredded tobacco collection container. If C(k, j) is 1, the shredded tobacco containing foreign objects in the square unit area A_j_k corresponding to C(k, j) is eliminated in the first process of step 3, and the air chamber corresponding to the air holes in the square unit area A_j_k maintains the original state in this process.

A third process, wherein, to avoid that a small amount of shredded tobacco still remains on the surface of the conveying cylinder after the first and second processes in step 3, a residual shredded tobacco clearing trigger line is set directly above a residual shredded tobacco collection container. When the area corresponding to the rectangular strip A_j is directly above the residual shredded tobacco collection container and a center line of the area coincides with the residual shredded tobacco clearing trigger line, the position trigger transmits a signal to the industrial computer, and meanwhile the industrial computer controls a second positive pressure control solenoid valve connected to the air chambers corresponding to the air holes in all the square unit areas A_j_k in the rectangular strip A_j to be opened for t1 seconds and then closed, so that the air chambers are in a positive pressure P2 state for t1 seconds and then in the normal pressure P0 state, the residual thin layer of shredded tobacco falls from the area corresponding to the rectangular strip A_j into the residual shredded tobacco collection container, and the values of all the elements C(1:Q, j) in the coding array are set to 0.

Preferably, the thin-layer thickness is adjusted by regulating a spacing between the thin-layer thickness adjustment roller and the horizontal conveyor belt or regulating a length of spike teeth.

Preferably, the identification of whether foreign objects exist in the area corresponding to the rectangular strip A_j comprises: if an absolute value |I_band_j_i| of the scanning signal I_band_j_i of the rectangular strip A_j under $\lambda\_i$ is less than the foreign object discrimination threshold D_i, an identification result being that foreign objects do not exist in the area corresponding to the rectangular strip A_j. While if |I_band_j_i| is greater than or equal to the foreign object discrimination threshold D_i, an identification result being that foreign objects exist in the area corresponding to the rectangular strip A_j.

Preferably, the further locating of the square unit area A_j_k containing the foreign objects in the rectangular strip A_j comprises: sequentially setting k to 1, 2, . . . , Q−1, Q. sequentially extracting a scanning signal I_band_j_i_k corresponding to the square unit area A_j_k from the scanning signal I_band_j_i of the rectangular strip A_j under $\lambda\_i$. If an absolute value |I_band_j_i_k| of the scanning signal I_band_j_i_k is less than the foreign object discrimination threshold D_i, an identification result being that foreign objects do not exist in the square unit area A_j_k corresponding to k. While if |I_band_j_i_k| is greater than or equal to the foreign object discrimination threshold D_i, an identification result being that foreign objects exist in the square unit area A_j_k corresponding to k.

Preferably, t1 is set to 1-20 seconds.

The present invention further provides a device for implementing the abovementioned detection method. The device includes the hopper, a regulating valve, the horizontal conveyor belt, the thin-layer thickness adjustment roller, the shredded tobacco elimination roller, the super-thick shredded tobacco collection hopper, the LED linear array light source, the line-scanning camera, the airflow nozzle array, the loose shredded tobacco collection hopper, the conveying cylinder, the air hole array, the air chambers, the first positive pressure control solenoid valve, the second positive pressure control solenoid valve, the negative pressure control solenoid valve, the industrial computer, a data cable, a programmable logic controller (PLC) control cabinet, the foreign object-containing shredded tobacco elimination trigger line, the qualified shredded tobacco unloading trigger line, the residual shredded tobacco clearing trigger line, the foreign object collection container, the qualified shredded tobacco collection container, the residual shredded tobacco collection container, a high-pressure air bag with an air pressure of P1, a high-pressure air bag with an air pressure of P2, a vacuum air bag, the position trigger, and a solenoid valve control panel.

The regulating valve is disposed at a bottom opening of the hopper and is used for controlling a material flow rate.

The hopper is located above the horizontal conveyor belt, so that materials flow out of the hopper and fall onto the horizontal conveyor belt. A motor is disposed on one side of the horizontal conveyor belt, an output shaft of the motor is connected to a driving wheel of the horizontal conveyor belt, and the motor is used for driving the horizontal conveyor belt to move.

The thin-layer thickness adjustment roller, the shredded tobacco elimination roller, and the super-thick shredded tobacco collection hopper are sequentially arranged above the horizontal conveyor belt. The shredded tobacco exceeding a set thickness is removed by the thin-layer thickness adjustment roller from the horizontal conveyor belt and is then conveyed by the shredded tobacco elimination roller into the super-thick shredded tobacco collection hopper.

The thin-layer thickness adjustment roller and the shredded tobacco elimination roller are each provided with a motor, an output shaft of the motor is connected to a driving wheel of the roller, and the motor is used for driving the roller to move.

The conveying cylinder is in butt joint with the far end of the horizontal conveyor belt, and shredded tobacco falls from the far end of the horizontal conveyor belt onto the surface of the conveying cylinder. The position trigger for determining rotation positions of the conveying cylinder is disposed at the joint between the conveying cylinder and the horizontal conveyor belt and is electrically connected to the industrial computer. The conveying cylinder is provided with a motor, an output shaft of the motor is connected to a driving wheel of the conveying cylinder, and the motor is used for driving the conveying cylinder to move. The air hole array is disposed on an outer layer of the surface of the conveying cylinder, and a bottom side of the air hole array is in communication with the air chambers.

Each of the air chambers is electrically connected to the first positive pressure control solenoid valve, the second positive pressure control solenoid valve, and the negative pressure control solenoid valve. The first positive pressure control solenoid valve is electrically connected to the high-pressure air bag with an air pressure of P1, the second positive pressure control solenoid valve is electrically connected to the high-pressure air bag with an air pressure of P2, and the negative pressure control solenoid valve is electrically connected to the vacuum air bag.

The airflow nozzle array is located above the conveying cylinder, and the loose shredded tobacco collection hopper is disposed below an airflow direction, so that the tangential airflows from the airflow nozzle array blow loose shredded tobacco on the surface of the thin layer of shredded tobacco on the conveying cylinder into the loose shredded tobacco collection hopper.

The LED linear array light source is located above the conveying cylinder. The LED linear array light source consists of N groups of LED lamp beads, and an $i^{th}$ group comprises E LED lamp beads capable of emitting light with a wavelength of $\lambda\_i$, where E is an integer greater than or equal to 1

The line-scanning camera is disposed above the conveying cylinder. The line-scanning camera has a line-scanning width of W, and the line-scanning camera is used for capturing an image of the thin layer of shredded tobacco in the line-scanning area.

The foreign object collection container, the qualified shredded tobacco collection container, and the residual shredded tobacco collection container are sequentially disposed along a rotation direction of the conveying cylinder.

The foreign object-containing shredded tobacco elimination trigger line is located above the foreign object collection container. When the area containing foreign objects is above the foreign object collection container and the center line of the area coincides with the foreign object-containing shredded tobacco elimination trigger line, the position trigger transmits a signal to the industrial computer, and the industrial computer judges the signal and controls the solenoid valves to be opened or closed via the solenoid valve control panel in the PLC control cabinet, so that the shredded tobacco containing foreign objects falls from the surface of the conveying cylinder into the foreign object collection container due to change of the air chamber.

The qualified shredded tobacco unloading trigger line is located above the qualified shredded tobacco collection container. When the area containing qualified shredded tobacco is above the qualified shredded tobacco collection container and the center line of the area coincides with the qualified shredded tobacco unloading trigger line, the position trigger transmits a signal to the industrial computer, and the industrial computer judges the signal and controls the solenoid valves to be opened or closed via the solenoid valve control panel in the PLC control cabinet, so that the qualified shredded tobacco falls from the surface of the conveying cylinder into the qualified shredded tobacco collection container due to change of the air chamber.

The residual shredded tobacco clearing trigger line is located above the residual shredded tobacco collection container. When the area containing residual shredded tobacco is above the residual shredded tobacco collection container and the center line of the area coincides with the residual shredded tobacco clearing trigger line, the position trigger transmits a signal to the industrial computer, and the industrial computer judges the signal and controls the solenoid valves to be opened or closed via the solenoid valve control panel in the PLC control cabinet, so that the residual shredded tobacco falls from the surface of the conveying cylinder into the residual shredded tobacco collection container due to change of the air chamber.

The solenoid valve control panel is disposed in the PLC control cabinet. The solenoid valve control panel is electrically connected to the industrial computer, the first positive pressure control solenoid valve, the second positive pressure control solenoid valve, and the negative pressure control solenoid valve. The solenoid valve control panel receives a feedback signal from the industrial computer and controls the first positive pressure control solenoid valve, second the positive pressure control solenoid valve, and the negative pressure control solenoid valve to be opened or closed.

The PLC control cabinet controls the airflow nozzle array to be opened or closed.

The industrial computer is electrically connected to the position trigger and receives and processes material position information collected by the position trigger.

The industrial computer is electrically connected to the line-scanning camera and receives and processes spectral information collected by the line-scanning camera.

Normal data processing programs, standard databases, and processing modules are built in the industrial computer, and are used for performing data processing on the spectral information of shredded tobacco and plastic foreign objects with low chromaticity difference to identify the plastic foreign objects with low chromaticity difference.

Preferably, the thin-layer thickness adjustment roller and the shredded tobacco elimination roller both rotate clockwise.

Preferably, spike teeth are provided on surfaces of the thin-layer thickness adjustment roller and the shredded tobacco elimination roller, and the spike teeth on the shredded tobacco elimination roller are distributed in a staggered manner with the spike teeth on the thin-layer thickness adjustment roller.

Preferably, the spike teeth on the thin-layer thickness adjustment roller and the shredded tobacco elimination roller are bow teeth and have adjustable lengths.

Preferably, each of the air chambers is corresponding to the air hole array containing 1-40 air holes.

Preferably, the airflow nozzle array is located above the butt joint between the conveying cylinder and the far end of the horizontal conveyor belt, and the airflow direction of the airflow nozzle array is the same as and is tangential to the rotation direction of the conveying cylinder.

Preferably, each group of the LEDs alone emit light uniformly irradiated onto the line-scanning area on the surface of the conveying cylinder.

Preferably, the airflow nozzle array and the line-scanning camera are sequentially arranged along the movement direction of the conveying cylinder.

Preferably, the qualified shredded tobacco collection container is arranged directly below the conveying cylinder.

Preferably, opening diameters of the foreign object collection container, the qualified shredded tobacco collection container, and the residual shredded tobacco collection container are 2-10 times the length of the area to be judged.

Preferably, the foreign object-containing shredded tobacco elimination trigger line, the qualified shredded tobacco unloading trigger line, and the residual shredded tobacco clearing trigger line are located directly above the foreign object collection container, the qualified shredded tobacco collection container, and the residual shredded tobacco collection container, respectively.

The present invention has the following beneficial effects.

According to the present invention, loose and randomly stacked shredded tobacco is formed into a fixed and continuous thin layer on the surface of the conveying cylinder under the effect of a negative pressure adsorption force, so that plastic foreign objects with low chromaticity difference in the shredded tobacco are more likely to be detected and eliminated. The surface of the cylinder is coded by areas, thereby realizing intelligent interworking between pulse line-scanning identification and positive pressure online elimination. The LED linear array light source containing characteristic wavelengths of plastics with low chromaticity difference emits optical pulses, and the line-scanning camera is used to obtain characteristic signals of the plastic foreign objects with low chromaticity difference efficiently in real time. Therefore, the limitations of the existing conventional techniques on detection of plastic foreign objects with low chromaticity difference in shredded tobacco are eliminated. The present invention solves the problems of material loading, identification, positioning, elimination, and unloading in the detection of plastic foreign objects with low chromaticity difference in shredded tobacco, so that plastic foreign objects with low chromaticity difference can be efficiently eliminated from the shredded tobacco.

Figure 1:
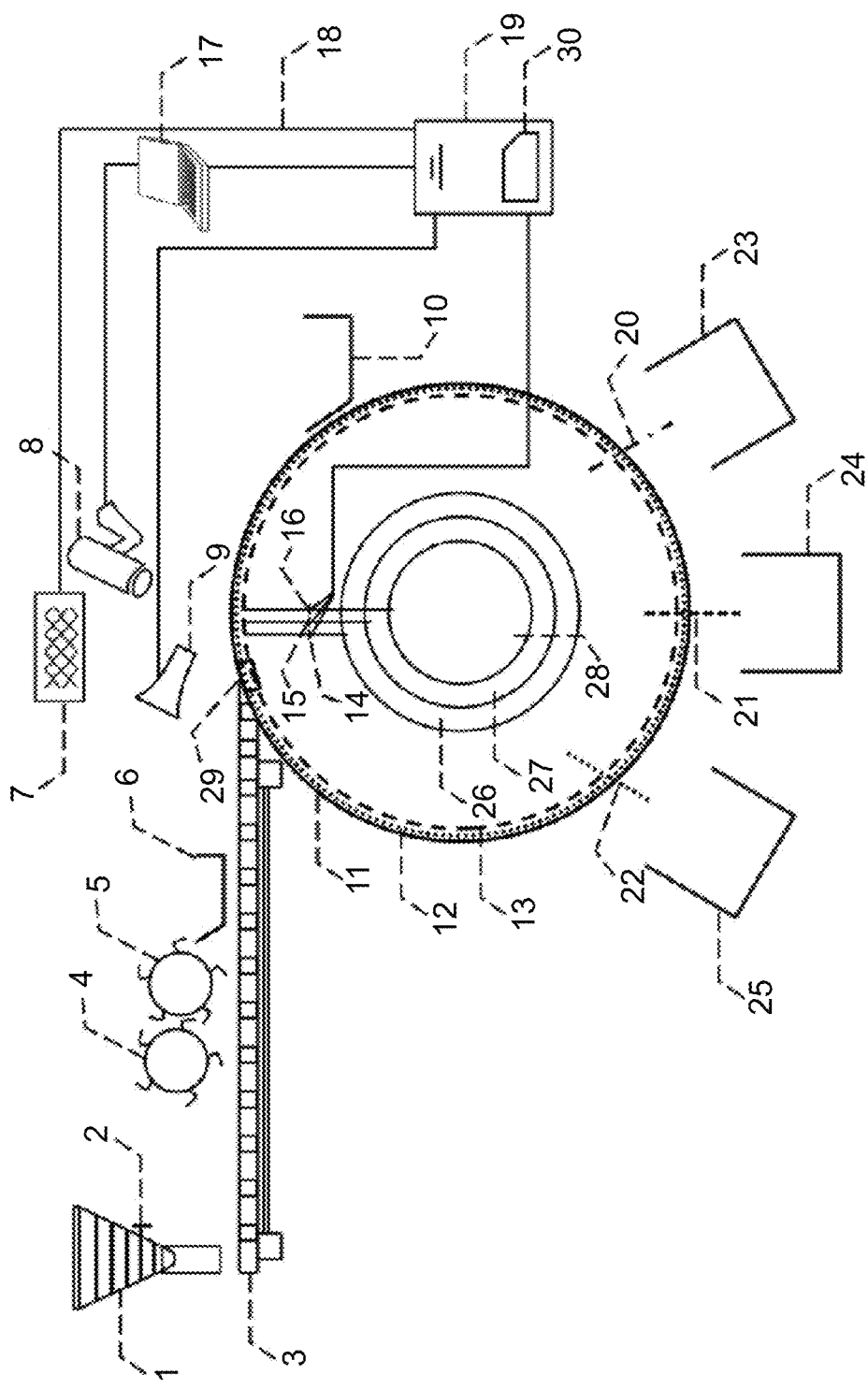
FIG. 1 is a schematic structural diagram of a device for detecting plastic foreign objects with low chromaticity difference in shredded tobacco through online pulse spectral imaging according to Embodiment 1 of the present invention.

In the drawings: 1. hopper; 2. regulating valve; 3. horizontal conveyor belt; 4. thin-layer thickness adjustment roller; 5. shredded tobacco elimination roller; 6. super-thick shredded tobacco collection hopper; 7. LED linear array light source; 8. line-scanning camera; 9. airflow nozzle array; 10. loose shredded tobacco collection hopper; 11. conveying cylinder; 12. air hole array; 13. air chamber; 14. first positive pressure control solenoid valve; 15. second positive pressure control solenoid valve; 16. negative pressure control solenoid valve; 17. industrial computer; 18. data cable; 19. PLC control cabinet; 20. foreign object-containing shredded tobacco elimination trigger line; 21. qualified shredded tobacco unloading trigger line; 22. residual shredded tobacco clearing trigger line; 23. foreign object collection container; 24. qualified shredded tobacco collection container; 25. residual shredded tobacco collection container; 26. high-pressure air bag with an air pressure of P1; 27. high-pressure air bag with an air pressure of P2; 28. vacuum air bag; 29. position trigger; 30. solenoid valve control panel.

DESCRIPTION OF THE EMBODIMENTS

The present invention is further described in detail below with reference to some specific embodiments, but the protection scope of the present invention is not limited thereto.

Embodiment 1

A method for detecting plastic foreign objects with low chromaticity difference in shredded tobacco through online pulse spectral imaging includes three steps, that is, negative pressure thin-layer loading of shredded tobacco, pulse line-scanning identification of shredded tobacco, and positive pressure online elimination of foreign objects.

Step 1: The negative pressure thin-layer loading of shredded tobacco includes the following processes.

In a first process, shredded tobacco falls from a hopper 1 onto a horizontal conveyor belt 3. When the shredded tobacco moves with the horizontal conveyor belt 3 to pass below a thin-layer thickness adjustment roller 4, the shredded tobacco exceeding a set thickness is removed by the thin-layer thickness adjustment roller 4, where the thickness of the shredded tobacco is adjusted by regulating the height between the thin-layer thickness adjustment roller 4 and the horizontal conveyor belt 3. The removed tobacco is taken away by a shredded tobacco elimination roller 5 into a super-thick shredded tobacco collection hopper 6.

In a second process, the shredded tobacco passes below the thin-layer thickness adjustment roller 4 and falls from a far end of the horizontal conveyor belt 3 onto a surface of a conveying cylinder 11, a negative pressure control solenoid valve 16 connected to air chambers 13 below the surface of the conveying cylinder 11 is opened, and the shredded tobacco is adsorbed on the surface of the conveying cylinder 11 under a negative pressure produced by airflows from outside into the air chambers 13 via an air hole array 12 on an outer layer of the conveying cylinder 11.

In a third process, when passing in front of an airflow nozzle array 9, loose shredded tobacco on the surface of a thin layer of shredded tobacco that is adsorbed by the negative pressure to the surface of the conveying cylinder 11 is blown into a loose shredded tobacco collection hopper 10 by airflows from nozzles, the airflows being tangential to the surface of the conveying cylinder 11, and a stable thin layer of the remaining shredded tobacco is formed on the surface of the conveying cylinder 11.

Step 2: The pulse line-scanning identification of shredded tobacco includes the following processes.

In a first process, the surface of the conveying cylinder 11 with a width W of 100 cm and a circumference L of 300 cm is coded. The surface of the conveying cylinder 11 is divided into 30 rectangular strips, each of the rectangular strips having a width of 100 cm and a length of cm and being marked as A_j. The rectangular strip A_j is divided into 10 square unit areas, each of the square unit areas having a side length of 10 cm and being marked as A_j_k. The surface of the conveying cylinder 11 is coded with a coding array C containing 10 rows and 30 columns and having an initial value of 0, where a coding rule is that C(k, j) is corresponding to the square unit area A_j_k, j is in a range of 1, 2, . . . , 29, 30, and k is in a range of 1, 2, . . . , 9, 10.

Figure 4:
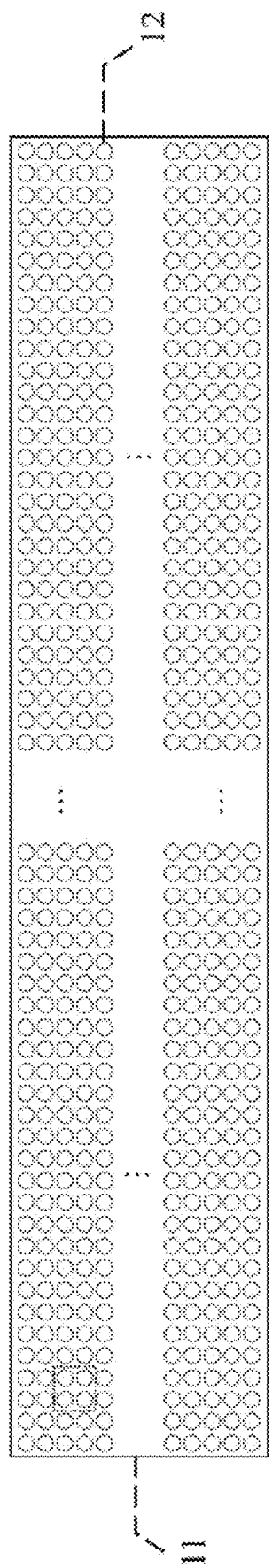
FIG. 4 is an unfolded view of a surface of a conveying cylinder according to Embodiment 1 of the present invention.

Four air holes are arranged below each of the square unit areas A_j_k (as shown in FIG. 4), and the four air holes are corresponding to one air chamber 13. A position trigger 29 and an industrial computer 17 are used to determine the corresponding position of the rectangular strip A_j on the conveying cylinder 11 at different time.

Figure 9:
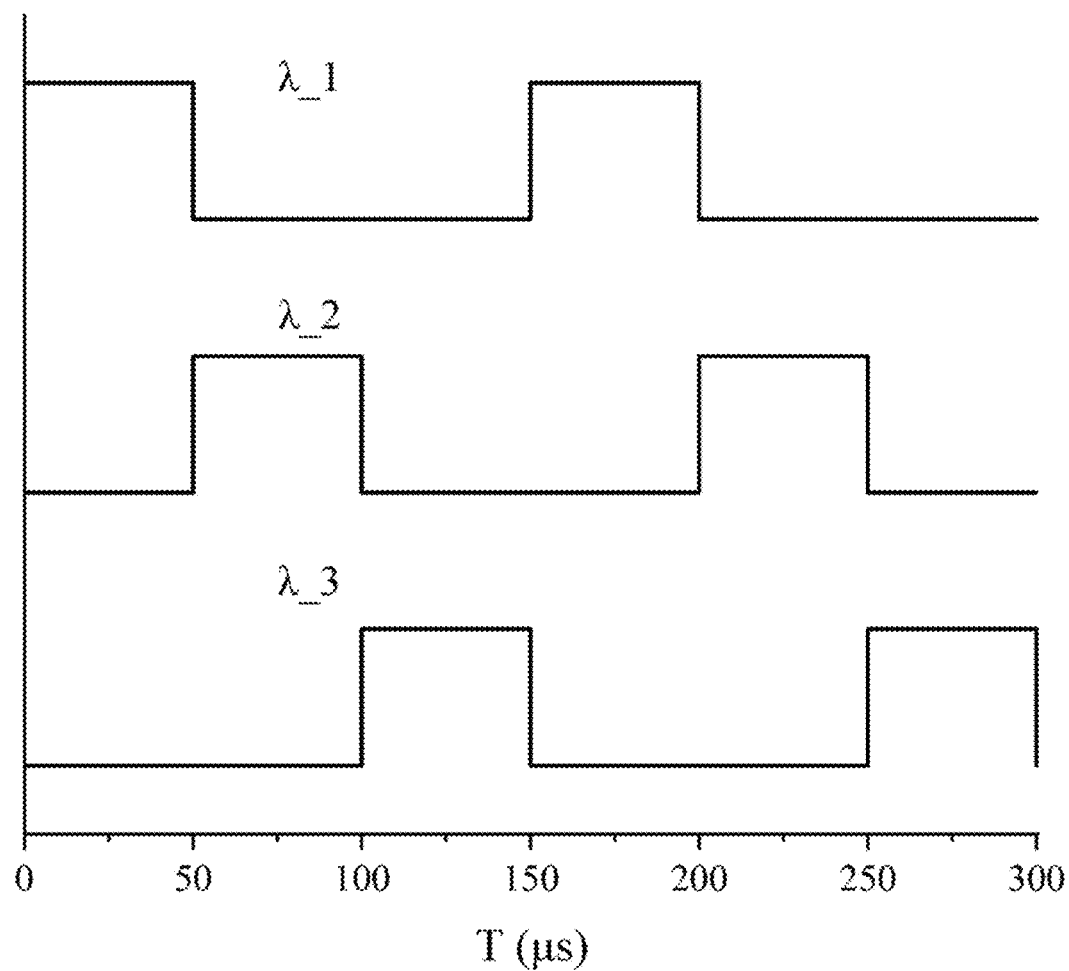
FIG. 9 shows pulse periods of an LED linear array light source corresponding to characteristic wavelengths according to Embodiment 1 of the present invention.

In a second process, the conveying cylinder 11 keeps rotating at a constant speed, a line-scanning area with a width of 100 cm is determined on the surface of the conveying cylinder 11, and an LED linear array light source 7 containing three characteristic wavelengths of plastics with low chromaticity difference is used together with a line-scanning camera 8 to capture an image of the thin layer of shredded tobacco in the line-scanning area. As shown in FIG. 9, the LED linear array light source corresponding to each of the characteristic wavelengths ($\lambda\_1$, $\lambda\_2$, $\lambda\_3$) sequentially and cyclically emits light with a pulse width of 50 μs, a pulse interval of 100 μs, and a pulse period of 150 μs in an imaging process (as shown in FIG. 9). When the rectangular strip A_j passes through the line-scanning area, the line-scanning camera 8 obtains in real time a scanning signal I_band_j_i corresponding to the rectangular strip A_j under irradiation of an $i^{th}$ characteristic wavelength $\lambda\_i$, where i is 1, 2, or 3.

In a third process, foreign object discrimination thresholds D_1, D_2, D_3 of scanning signals corresponding to the three characteristic wavelengths $\lambda\_1$, $\lambda\_2$, $\lambda\_3$ are used together with the scanning signal I_band_j_i obtained in real time and corresponding to the rectangular strip A_j under irradiation of the $i^{th}$ characteristic wavelength to identify whether foreign objects exist in the area corresponding to the rectangular strip A_j. If an identification result is that foreign objects do not exist in the area corresponding to the rectangular strip A_j, the values of elements C(1:10, j) in a $j^{th}$ column of the coding array C remain unchanged. If an identification result is that foreign objects exist in the area corresponding to the rectangular strip A_j, the square unit area A_j_k containing the foreign objects in the rectangular strip A_j is further located, and the corresponding C(k, j) in the coding array C is set to 1.

When plastic foreign objects with low chromaticity difference that are sensitive to λ_1 do not exist in the rectangular strip A_1, the identification process is as follows.

An absolute value |I_band_1_1| of a scanning signal I_band_1_1 of the rectangular strip A_1 under λ_1 is compared with the foreign object discrimination threshold D_1. |I_band_1_1| will be less than D_1, the identification result is that foreign objects do not exist in the area corresponding to the rectangular strip A_1, and the values of elements C(1:10, 1) in a first column of the coding array C remain unchanged.

When plastic foreign objects with low chromaticity difference that are sensitive to λ_1 do not exist in the square unit area A_2_1 in the rectangular strip A_2, while plastic foreign objects with low chromaticity difference that are sensitive to λ_1 exist in the square unit area A_2_2, the identification process is as follows.

An absolute value |I_band_2_1| of a scanning signal I_band_2_1 of the rectangular strip A_2 under λ_1 is compared with the foreign object discrimination threshold D_1. |I_band_2_1| will be greater than D_1, the identification result is that foreign objects exist in the area corresponding to the rectangular strip A_2, and the square unit area A_2_k containing the foreign objects in the rectangular strip A_2 is further located. A scanning signal I_band_2_1_1 corresponding to the square unit area A_2_1 is extracted from the scanning signal I_band_2_1 of the rectangular strip A_2 under λ_1, and when an absolute value |I_band_2_1_1| of the scanning signal I_band_2_1_1 is less than the foreign object discrimination threshold D_1, the identification result is that foreign objects do not exist in the square unit area A_2_1 when k=1 and the value of C(1, 2) in the coding array C remains unchanged. A scanning signal I_band_2_1_2 corresponding to the square unit area A_2_2 is extracted from the scanning signal I_band_2_1 of the rectangular strip A_2 under λ_1, and when an absolute value |I_band_2_1_2| of the scanning signal I_band_2_1_2 is greater than the foreign object discrimination threshold D_1, the identification result is that foreign objects exist in the square unit area A_2_2 when k=2 and the corresponding C(2, 2) in the coding array C is set to 1.

Step 3: The positive pressure online elimination of foreign objects includes the following processes. When plastic foreign objects with low chromaticity difference only exist in the square unit area A_2_2, the identification process is as follows.

In a first process, a foreign object-containing shredded tobacco elimination trigger line 20 is set directly above a foreign object collection container 23. When the area corresponding to the rectangular strip A_2 is directly above the foreign object collection container 23 and a center line of the area coincides with the foreign object-containing shredded tobacco elimination trigger line 20, the position trigger 29 transmits a signal to the industrial computer 17, and meanwhile the industrial computer 17 reads elements C(1:10, 2) corresponding to the rectangular strip A_2 in the coding array and sequentially reads the values of all the elements in C(1:10, 2). If C(1, 2) is 0, it indicates that foreign objects do not exist in the square unit area A_2_1 corresponding to C(1, 2), therefore, the air chamber 13 corresponding to the air holes in the square unit area A_2_1 maintains the original state, and the thin layer of shredded tobacco in the square unit area remains adsorbed by the negative pressure. If C(2, 2) is 1, it indicates that foreign objects exist in the square unit area A_2_2 corresponding to C(2, 2), therefore, the negative pressure control solenoid valve 16 connected to the air chamber 13 corresponding to the air holes in the square unit area A_2_2 is closed and a first positive pressure control solenoid valve 14 also connected to the air chamber is opened for 2 s and then closed, so that the air chamber 13 corresponding to the air holes in the square unit area A_2_2 is in a positive pressure P1 state for 2 s and then in a normal pressure P0 state, and the thin layer of shredded tobacco containing foreign objects falls from the square unit area A_2_2 into the foreign object collection container 23.

In a second process, a qualified shredded tobacco unloading trigger line 21 is set directly above a qualified shredded tobacco collection container 24. When the area corresponding to the rectangular strip A_1 is directly above the qualified shredded tobacco collection container 24 and a center line of the area coincides with the qualified shredded tobacco unloading trigger line 21, the position trigger 29 transmits a signal to the industrial computer 17, and meanwhile the industrial computer 17 reads the elements C(1:10, 1) corresponding to the rectangular strip A_1 in the coding array and sequentially reads the values of all the elements in C(1:10, 1). If C(1, 1) is 0, the thin layer of shredded tobacco in the square unit area A_1_1 corresponding to C(1, 1) is qualified, the negative pressure control solenoid valve 16 connected to the air chamber 13 corresponding to the air holes in the square unit area A_1_1 is closed, and the first positive pressure control solenoid valve 14 also connected to the air chamber is opened for 2 s and then closed, so that the air chamber 13 corresponding to the air holes in the square unit area A_1_1 is in the positive pressure P1 state for 2 s and then in the normal pressure P0 state, and the qualified thin layer of shredded tobacco falls from the square unit area A_1_1 into the qualified shredded tobacco collection container 24.

In a third process, to avoid that a small amount of shredded tobacco still remains on the surface of the conveying cylinder 11 after the first and second processes in step 3, a residual shredded tobacco clearing trigger line 22 is set directly above a residual shredded tobacco collection container 25. When the area corresponding to the rectangular strip A_j is directly above the residual shredded tobacco collection container 25 and a center line of the area coincides with the residual shredded tobacco clearing trigger line 22, the position trigger 29 transmits a signal to the industrial computer 17, and meanwhile the industrial computer 17 controls a second positive pressure control solenoid valve 15 connected to the air chambers 13 corresponding to the air holes in all the square unit areas A_j_k in the rectangular strip A_j to be opened for 2 s and then closed, so that the air chambers are in a positive pressure P2 state for 2 s and then in the normal pressure P0 state, the residual thin layer of shredded tobacco falls from the area corresponding to the rectangular strip A_j into the residual shredded tobacco collection container 25, and the values of all the elements C(1:10, j) in the coding array are set to 0.

As shown in FIG. 1 to FIG. 8, the present invention further provides a device for implementing the method for detecting plastic foreign objects with low chromaticity difference in shredded tobacco through online pulse spectral imaging.

The device includes the hopper 1, a regulating valve 2, the horizontal conveyor belt 3, the thin-layer thickness adjustment roller 4, the shredded tobacco elimination roller 5, the super-thick shredded tobacco collection hopper 6, the LED linear array light source 7, the line-scanning camera 8, the airflow nozzle array 9, the loose shredded tobacco collection hopper 10, the conveying cylinder 11, the air hole array 12, the air chambers 13, the first positive pressure control solenoid valve 14, the second positive pressure control solenoid valve 15, the negative pressure control solenoid valve III 16, the industrial computer 17, a data cable 18, a PLC control cabinet 19, the foreign object-containing shredded tobacco elimination trigger line 20, the qualified shredded tobacco unloading trigger line 21, the residual shredded tobacco clearing trigger line 22, the foreign object collection container 23, the qualified shredded tobacco collection container 24, the residual shredded tobacco collection container 25, a high-pressure air bag with an air pressure of P1 26, a high-pressure air bag with an air pressure of P2 27, a vacuum air bag 28, the position trigger 29, and a solenoid valve control panel 30.

The regulating valve 2 is disposed at a bottom opening of the hopper 1 and is used for controlling a material flow rate.

The hopper 1 is arranged perpendicular to the horizontal conveyor belt 3, and an outlet of the hopper is located above the horizontal conveyor belt 3, so that materials flow out of the hopper 1 and fall onto the horizontal conveyor belt 3. A motor is disposed on one side of the horizontal conveyor belt 3, an output shaft of the motor is connected to a driving wheel of the horizontal conveyor belt 3, and the motor is used for driving the horizontal conveyor belt 3 to move.

Figure 2:
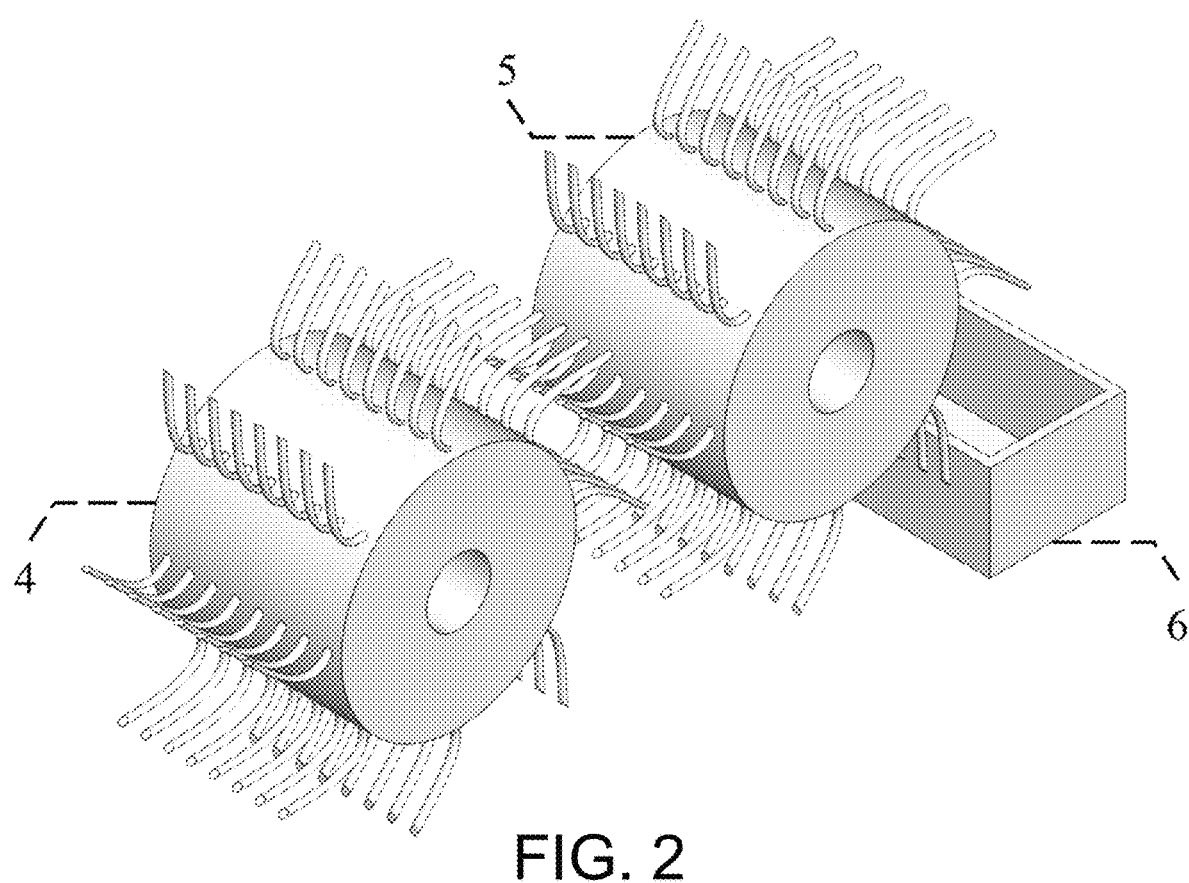
FIG. 2 is a schematic three-dimensional view of a thin-layer thickness adjustment roller, a shredded tobacco elimination roller, and a super-thick shredded tobacco collection hopper according to Embodiment 1 of the present invention.
Figure 3:
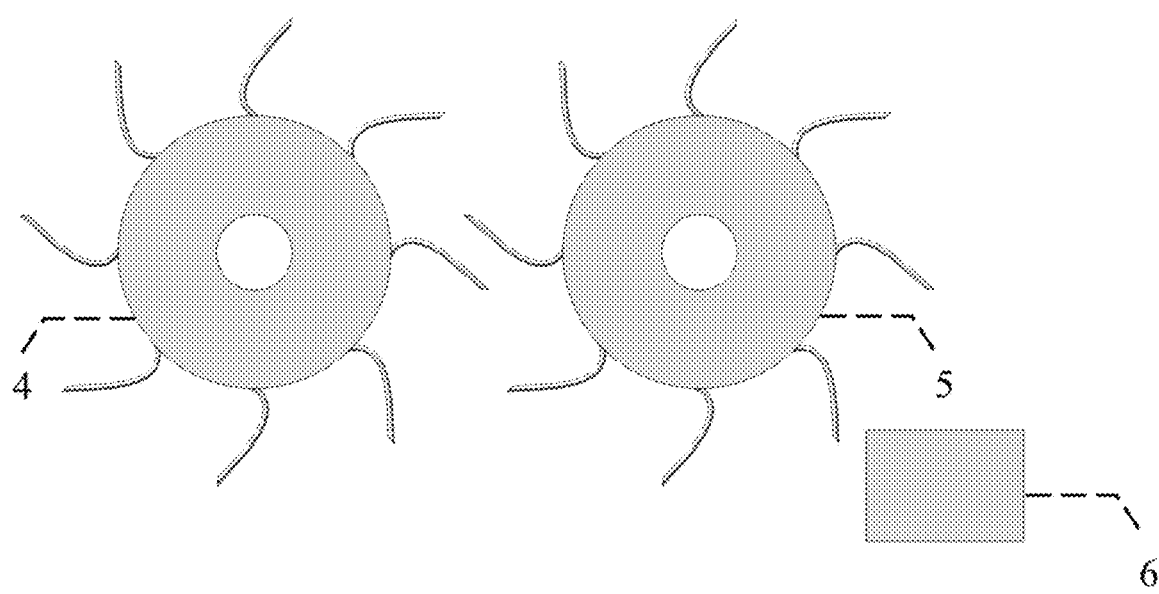
FIG. 3 is a schematic plan view of the thin-layer thickness adjustment roller, the shredded tobacco elimination roller, and the super-thick shredded tobacco collection hopper according to Embodiment 1 of the present invention.

The thin-layer thickness adjustment roller 4, the shredded tobacco elimination roller 5, and the super-thick shredded tobacco collection hopper 6 are sequentially arranged above the horizontal conveyor belt 3. The thin-layer thickness adjustment roller 4 and the shredded tobacco elimination roller 5 both rotate clockwise. As shown in FIG. 2 and FIG. 3, spike teeth are provided on surfaces of the thin-layer thickness adjustment roller 4 and the shredded tobacco elimination roller 5, and the spike teeth on the shredded tobacco elimination roller 5 are distributed in a staggered manner with the spike teeth on the thin-layer thickness adjustment roller 4.

Figure 5:
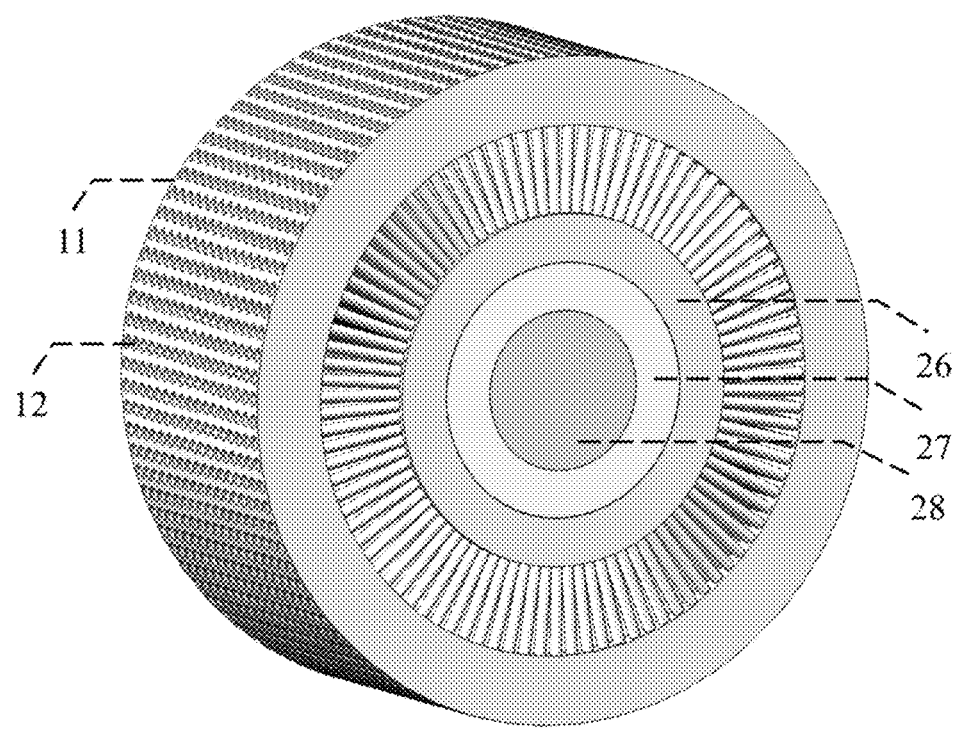
FIG. 5 is a schematic three-dimensional structural diagram of the conveying cylinder according to Embodiment 1 of the present invention.
Figure 6:
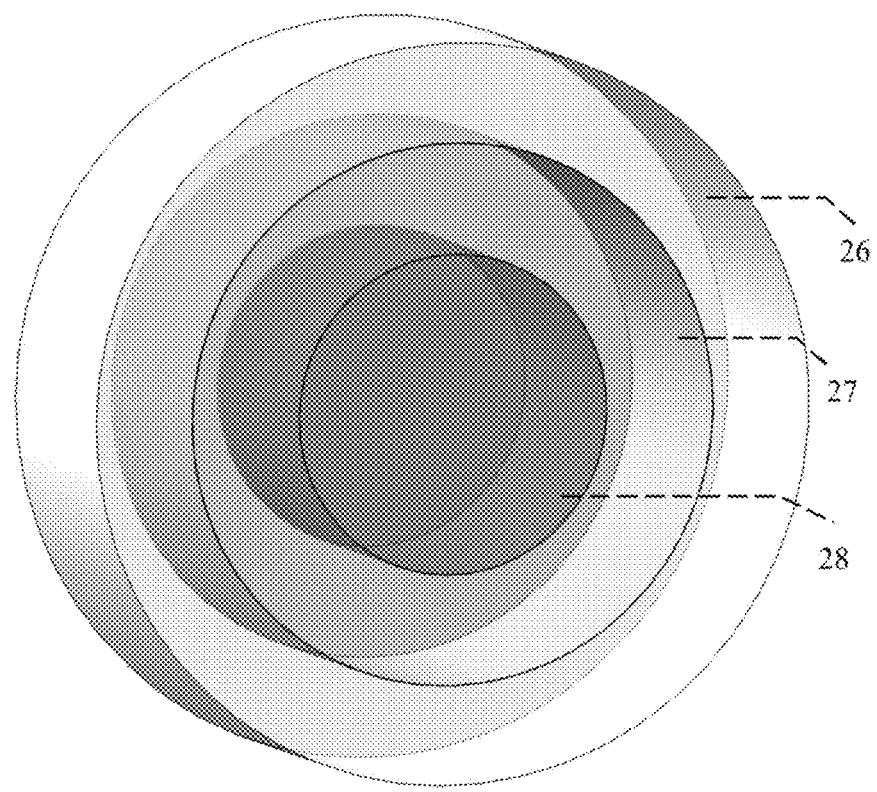
FIG. 6 is a schematic structural diagram showing positions of control solenoid valves according to Embodiment 1 of the present invention.

The thin-layer thickness adjustment roller 4 and the shredded tobacco elimination roller are each provided with a motor, an output shaft of the motor is connected to a driving wheel of the roller, and the motor is used for driving the roller to move. The conveying cylinder 11 is in butt joint with the far end of the horizontal conveyor belt 3, and shredded tobacco falls from the far end of the horizontal conveyor belt 3 onto the surface of the conveying cylinder 11. The position trigger 29 for determining rotation positions of the conveying cylinder 11 is disposed at the joint between the conveying cylinder 11 and the horizontal conveyor belt 3 and is electrically connected to the industrial computer 17 via the data cable 18. The conveying cylinder 11 is provided with a motor, an output shaft of the motor is connected to a driving wheel of the cylinder, and the motor is used for driving the cylinder to move. The conveying cylinder 11 has a width of 100 cm and a circumference of 300 cm, and conveys materials clockwise. The air hole array 12 is disposed on an outer layer of the surface of the conveying cylinder 11 and the details are shown in FIG. 5. The air hole array 12 consists of a plurality of uniformly distributed air holes, the bottom side of the air hole array 12 is in communication with the air chambers 13, and every four air holes are corresponding to one air chamber 13.

Figure 7:
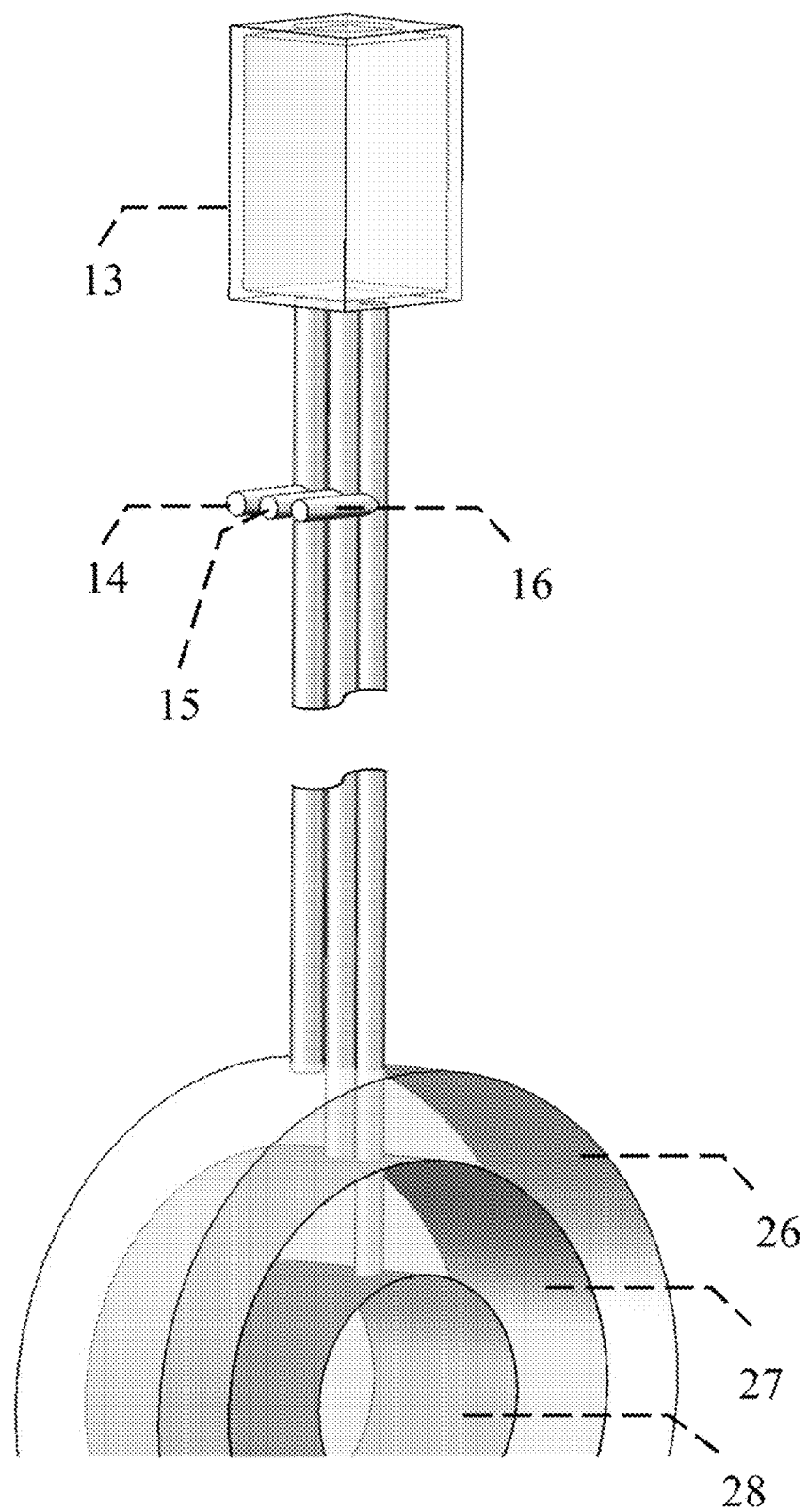
FIG. 7 is a schematic structural diagram of an air chamber and the control solenoid valves according to Embodiment 1 of the present invention.

As shown in FIG. 7, each of the air chambers 13 is electrically connected to the first positive pressure control solenoid valve 14, the second positive pressure control solenoid valve and the negative pressure control solenoid valve 16. The first positive pressure control solenoid valve I is electrically connected to the high-pressure air bag with an air pressure of P1 26, the second positive pressure control solenoid valve 15 is electrically connected to the high-pressure air bag with an air pressure of P2 27, and the negative pressure control solenoid valve III 16 is electrically connected to the vacuum air bag 28.

The airflow nozzle array 9 is located above the butt joint between the conveying cylinder 11 and the far end of the horizontal conveyor belt 3, and the airflow direction is the same as and is tangential to the rotation direction of the conveying cylinder 11. The loose shredded tobacco collection hopper 10 is disposed below the airflow direction, so that the tangential airflows from the airflow nozzle array 9 blow loose shredded tobacco on the surface of the thin layer of shredded tobacco on the conveying cylinder 11 into the loose shredded tobacco collection hopper 10.

The LED linear array light source 7 is located above the conveying cylinder 11. The LED linear array light source 7 consists of three groups of LED lamp beads, where the first, second, and third groups each include 20 LED lamp beads and are capable of emitting light with wavelengths of $\lambda\_1$, $\lambda\_2$, and $\lambda\_3$, respectively. Each group of the LEDs alone can emit light uniformly irradiated onto the line-scanning area on the surface of the conveying cylinder 11.

Figure 8:
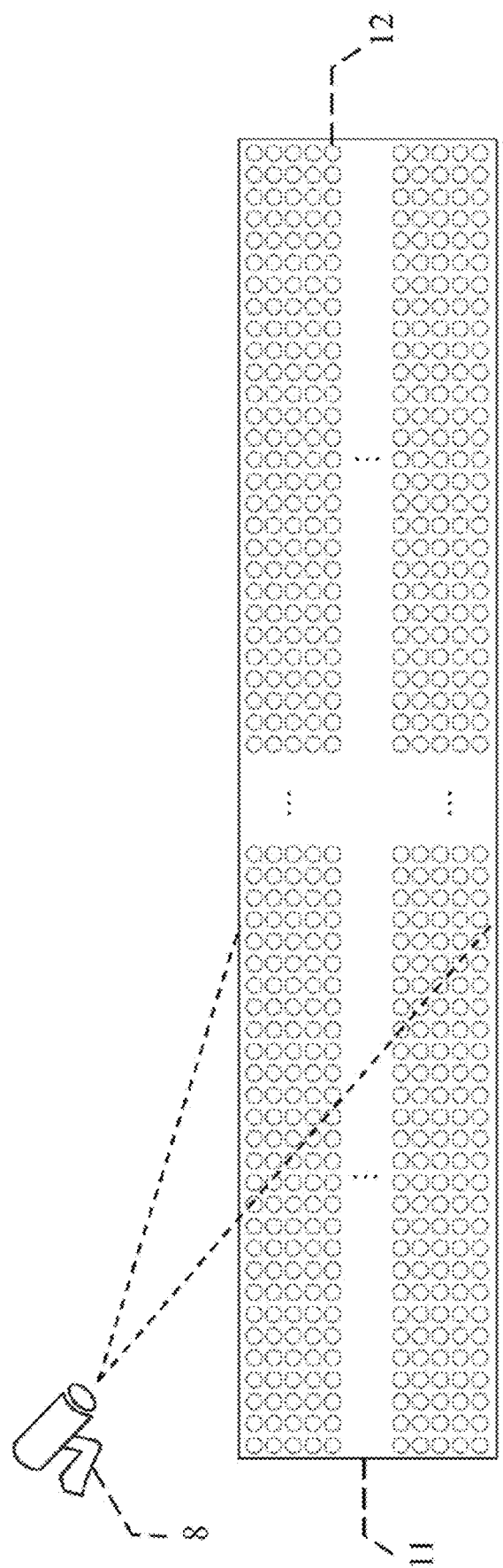
FIG. 8 is a schematic diagram showing a scanning area of a line-scanning camera according to Embodiment 1 of the present invention.

The line-scanning camera 8 is disposed at a rear side of the airflow nozzle array along the movement direction of the conveying cylinder 11. The line-scanning camera 8 has a line-scanning width of 100 cm, and the line-scanning camera 8 is used for capturing an image of the thin layer of shredded tobacco in the line-scanning area. The scanning process of the line-scanning camera is shown in FIG. 8.

The foreign object collection container 23, the qualified shredded tobacco collection container 24, and the residual shredded tobacco collection container 25 are sequentially disposed along the rotation direction of the conveying cylinder 11, and the qualified shredded tobacco collection container 24 is located directly below the conveying cylinder 11.

The foreign object-containing shredded tobacco elimination trigger line 20 is located directly above the foreign object collection container 23. When the area containing foreign objects is directly above the foreign object collection container 23 and the center line of the area coincides with the foreign object-containing shredded tobacco elimination trigger line 20, the position trigger 29 transmits a signal to the industrial computer 17, and the industrial computer 17 judges the signal and controls the solenoid valves to be opened or closed via the solenoid valve control panel 30, so that the shredded tobacco containing foreign objects falls from the surface of the conveying cylinder 11 into the foreign object collection container 23 due to change of the air chamber 13.

The qualified shredded tobacco unloading trigger line 21 is located directly above the qualified shredded tobacco collection container 24. When the area containing qualified shredded tobacco is directly above the qualified shredded tobacco collection container 24 and the center line of the area coincides with the qualified shredded tobacco unloading trigger line 21, the position trigger 29 transmits a signal to the industrial computer 17, and the industrial computer 17 judges the signal and controls the solenoid valves to be opened or closed via the solenoid valve control panel 30, so that the qualified shredded tobacco falls from the surface of the conveying cylinder 11 into the qualified shredded tobacco collection container 24 due to change of the air chamber 13.

The residual shredded tobacco clearing trigger line 22 is located directly above the residual shredded tobacco collection container 25. When the area containing residual shredded tobacco is directly above the residual shredded tobacco collection container 25 and the center line of the area coincides with the residual shredded tobacco clearing trigger line 22, the position trigger 29 transmits a signal to the industrial computer 17, and the industrial computer 17 judges the signal and controls the solenoid valves to be opened or closed via the solenoid valve control panel 30, so that the residual shredded tobacco falls from the surface of the conveying cylinder 11 into the residual shredded tobacco collection container 25 due to change of the air chamber 13.

The solenoid valve control panel 30 is disposed in the PLC control cabinet 19. The solenoid valve control panel 30 is electrically connected to the industrial computer 17, the first positive pressure control solenoid valve 14, the second positive pressure control solenoid valve and the negative pressure control solenoid valve 16. The solenoid valve control panel 30 receives a feedback signal from the industrial computer 17 and controls the first positive pressure control solenoid valve 14, the second positive pressure control solenoid valve 15, and the negative pressure control solenoid valve 16 to be opened or closed.

The PLC control cabinet 19 controls the airflow nozzle array 9 to be opened or closed.

The industrial computer 17 is connected to the position trigger 29 via the data cable 18 and receives and processes material position information collected by the position trigger 29.

The industrial computer 17 is connected to the line-scanning camera 8 via the data cable 18 and receives and processes spectral information collected by the line-scanning camera 8.

Normal data processing programs, standard databases, and processing modules are built in the industrial computer 17, and are used for performing data processing on the spectral information of shredded tobacco and plastic foreign objects with low chromaticity difference to identify the plastic foreign objects with low chromaticity difference.

It should be noted that the above embodiments are merely used for illustrating the present invention, instead of limiting the technical solutions described in the present invention. Therefore, although the present invention has been described in detail with reference to the above embodiments, persons of ordinary skill in the art should understand that modifications or equivalent replacements can still be made to the present invention. All the technical solutions and improvements that do not depart from the spirit and scope of the present invention shall fall within the scope of the appended claims of the present invention.

What is claimed is:

1. A method for detecting plastic foreign objects with low chromaticity difference in shredded tobacco through online pulse spectral imaging, the method comprising the following steps:
    step 1: negative pressure thin-layer loading of shredded tobacco, comprising the following processes:
    a first process, wherein shredded tobacco falls from a hopper onto a horizontal conveyor belt, and when the shredded tobacco is conveyed by the horizontal conveyor belt to pass below a thin-layer thickness adjustment roller, the shredded tobacco exceeding a set thickness is removed by the thin-layer thickness adjustment roller to a shredded tobacco elimination roller and is then taken away by the shredded tobacco elimination roller into a super-thick shredded tobacco collection hopper;
    a second process, wherein the shredded tobacco adjusted by the thin-layer thickness adjustment roller is continuously conveyed by the horizontal conveyor belt and falls from a far end of the horizontal conveyor belt onto a surface of a conveying cylinder; meanwhile, a negative pressure control solenoid valve connected to air chambers below the surface of the conveying cylinder is opened, and the shredded tobacco is adsorbed on the surface of the conveying cylinder under a negative pressure produced by airflows from outside into air holes of an air hole array on an outer layer of the conveying cylinder; and
    a third process, wherein loose shredded tobacco on a surface of a thin layer of the shredded tobacco adsorbed by the negative pressure to the surface of the conveying cylinder is blown into a loose shredded tobacco collection hopper by airflows from nozzles in an airflow nozzle array, the airflows being tangential to the surface of the conveying cylinder, and a stable thin layer of the remaining shredded tobacco is formed on the surface of the conveying cylinder;
    step 2: pulse line-scanning identification of shredded tobacco, comprising the following processes:
    a first process, wherein the surface of the conveying cylinder with a width of W and a circumference of L is coded, the surface of the conveying cylinder is divided into P rectangular strips, each of the rectangular strips having a width of W and a length of L/P and being marked as $A\_j$; the rectangular strip $A\_j$ is divided into Q square unit areas, each of the square unit areas having a side length of L/P and being marked as $A\_j\_k$; and the surface of the conveying cylinder is coded with a coding array C containing Q rows and P columns and having an initial value of 0, wherein a coding rule is that $C(k, j)$ corresponds to the square unit area $A\_j\_k$, P and Q are positive integers, j is in a range of 1, 2, . . . , P−1, P, and k is in a range of 1, 2, . . . , Q−1, Q;
    wherein u air holes are arranged below each of the square unit areas $A\_j\_k$, and the u air holes correspond to one air chamber, wherein u is a positive integer; a position trigger and an industrial computer are used to determine a corresponding position of the rectangular strip $A\_j$ on the conveying cylinder at different time;
    a second process, wherein the conveying cylinder keeps rotating at a constant speed, a line-scanning area with a width of W is determined on the surface of the conveying cylinder, and a light-emitting diode (LED) linear array light source containing N characteristic wavelengths of plastics with low chromaticity difference is used together with a line-scanning camera to capture an image of the thin layer of shredded tobacco in the line-scanning area; the LED linear array light source corresponding to each of the characteristic wavelengths sequentially and cyclically emits light with a pulse width of T/N, a pulse interval of T(N−1)/N, and a pulse period of T in an imaging process; when the rectangular strip $A\_j$ passes through the line-scanning area, the line-scanning camera obtains in real time a scanning signal $I\_band\_j\_i$ corresponding to the rectangular strip $A\_j$ under irradiation of an $i^{th}$ characteristic wavelength $\lambda\_i$, wherein i is in a range of 1, 2, . . . , N−1, N and N is a positive integer; the pulse period T is in a range of 1.5-3000 μs; and a third process, wherein foreign object discrimination thresholds $D\_i$ of scanning signals corresponding to the N characteristic wavelengths $\lambda\_i$ are used together with the scanning signal $I\_band\_j\_i$ obtained in real time and corresponding to the rectangular strip $A\_j$ under irradiation of the $i^{th}$ characteristic wavelength to identify whether foreign objects exist in an area corresponding to the rectangular strip $A\_j$; if an identification result is that foreign objects do not exist in the area corresponding to the rectangular strip $A\_j$, values of elements $C(1:Q, j)$ in a $j^{th}$ column of the coding array C remain unchanged; if an identification result is that foreign objects exist in the area corresponding to the rectangular strip $A\_j$, the square unit area $A\_j\_k$ containing the foreign objects in the rectangular strip $A\_j$ is further located, and the corresponding $C(k, j)$ in the coding array C is set to 1; and step 3: positive pressure online elimination of foreign objects, comprising the following processes:

a first process, wherein a foreign object-containing shredded tobacco elimination trigger line is set directly above a foreign object collection container; when the area corresponding to the rectangular strip $A\_j$ is directly above the foreign object collection container and a center line of the area coincides with the foreign object-containing shredded tobacco elimination trigger line, the position trigger transmits a signal to the industrial computer, and meanwhile the industrial computer reads the elements $C(1:Q, j)$ corresponding to the rectangular strip $A\_j$ in the coding array and sequentially reads values of all elements $C(k, j)$ in $C(1:Q, j)$; if $C(k, j)$ is 0, foreign objects do not exist in the square unit area $A\_j\_k$ corresponding to $C(k, j)$, the air chamber corresponding to the air holes in the square unit area $A\_j\_k$ maintains an original state, and the thin layer of shredded tobacco in the square unit area remains adsorbed by the negative pressure; if $C(k, j)$ is 1, foreign objects exist in the square unit area $A\_j\_k$ corresponding to $C(k, j)$, the negative pressure control solenoid valve connected to the air chamber corresponding to the air holes in the square unit area $A\_j\_k$ is closed and a first positive pressure control solenoid valve also connected to the air chamber is opened for t1 seconds and then closed, so that the air chamber corresponding to the air holes in the square unit area $A\_j\_k$ is in a positive pressure P1 state for t1 seconds and then in a normal pressure P0 state, and the thin layer of shredded tobacco containing foreign objects falls from the square unit area $A\_j\_k$ into the foreign object collection container;

a second process, wherein a qualified shredded tobacco unloading trigger line is set directly above a qualified shredded tobacco collection container; when the area corresponding to the rectangular strip $A\_j$ is directly above the qualified shredded tobacco collection container and a center line of the area coincides with the qualified shredded tobacco unloading trigger line, the position trigger transmits a signal to the industrial computer, and meanwhile the industrial computer reads the elements $C(1:Q, j)$ corresponding to the rectangular strip $A\_j$ in the coding array and sequentially reads the values of all the elements in $C(1:Q, j)$; if $C(k, j)$ is 0, the thin layer of shredded tobacco in the square unit area $A\_j\_k$ corresponding to $C(k, j)$ is qualified, the negative pressure control solenoid valve connected to the air chamber corresponding to the air holes in the square unit area $A\_j\_k$ is closed, and the first positive pressure control solenoid valve also connected to the air chamber is opened for t1 seconds and then closed, so that the air chamber corresponding to the air holes in the square unit area $A\_j\_k$ is in the positive pressure P1 state for t1 seconds and then in the normal pressure P0 state, and the qualified thin layer of shredded tobacco falls from the square unit area $A\_j\_k$ into the qualified shredded tobacco collection container; if $C(k, j)$ is 1, the shredded tobacco containing foreign objects in the square unit area $A\_j\_k$ corresponding to $C(k, j)$ is eliminated in the first process of step 3, and the air chamber corresponding to the air holes in the square unit area $A\_j\_k$ maintains the original state in this process; and a third process, wherein to avoid that a small amount of shredded tobacco still remains on the surface of the conveying cylinder after the first and second processes in the step 3, a residual shredded tobacco clearing trigger line is set directly above a residual shredded tobacco collection container; when the area corresponding to the rectangular strip $A\_j$ is directly above the residual shredded tobacco collection container and a center line of the area coincides with the residual shredded tobacco clearing trigger line, the position trigger transmits a signal to the industrial computer, and meanwhile the industrial computer controls a second positive pressure control solenoid valve connected to the air chambers corresponding to the air holes in all the square unit areas $A\_j\_k$ in the rectangular strip $A\_j$ to be opened for t1 seconds and then closed, so that the air chambers are in a positive pressure P2 state for t1 seconds and then in the normal pressure P0 state, the residual thin layer of shredded tobacco falls from the area corresponding to the rectangular strip $A\_j$ into the residual shredded tobacco collection container, and the values of all the elements $C(1:Q, j)$ in the coding array are set to 0.

2. The method for detecting the plastic foreign objects with the low chromaticity difference in the shredded tobacco through the online pulse spectral imaging according to claim 1, wherein a thin-layer thickness is adjusted by regulating a spacing between the thin-layer thickness adjustment roller and the horizontal conveyor belt or regulating a length of spike teeth.

3. The method for detecting the plastic foreign objects with the low chromaticity difference in the shredded tobacco through the online pulse spectral imaging according to claim 1, wherein the identification of whether foreign objects exist in the area corresponding to the rectangular strip $A\_j$ comprises: if an absolute value $|I\_band\_j\_i|$ of the scanning signal $I\_band\_j\_i$ of the rectangular strip $A\_j$ under $\lambda\_i$ is less than the foreign object discrimination threshold $D\_i$, an identification result being that foreign objects do not exist in the area corresponding to the rectangular strip $A\_j$; while if $|I\_band\_j\_i|$ is greater than or equal to the foreign object discrimination threshold $D\_i$, an identification result being that foreign objects exist in the area corresponding to the rectangular strip $A\_j$.

4. The method for detecting the plastic foreign objects with the low chromaticity difference in the shredded tobacco through the online pulse spectral imaging according to claim 1, wherein the further locating of the square unit area $A\_j\_k$ containing the foreign objects in the rectangular strip $A\_j$ comprises: sequentially setting k to 1, 2, . . . , Q−1, Q; sequentially extracting a scanning signal $I\_band\_j\_i\_k$ corresponding to the square unit area $A\_j\_k$ from the scanning signal I_band_j_i of the rectangular strip A_j under λ_i; if an absolute value |I_band_j_i_k| of the scanning signal I_band_j_i_k is less than the foreign object discrimination threshold D_i, an identification result being that foreign objects do not exist in the square unit area A_j_k corresponding to k; while if |I_band_j_i_k| is greater than or equal to the foreign object discrimination threshold D_i, an identification result being that foreign objects exist in the square unit area A_j_k corresponding to k.

5. The method for detecting the plastic foreign objects with the low chromaticity difference in the shredded tobacco through the online pulse spectral imaging according to claim 1, wherein t1 is set to 1-20 seconds.

6. A device for implementing the method according to claim 1, wherein the device comprising the hopper, a regulating valve, the horizontal conveyor belt, the thin-layer thickness adjustment roller, the shredded tobacco elimination roller, the super-thick shredded tobacco collection hopper, the LED linear array light source, the line-scanning camera, the airflow nozzle array, the loose shredded tobacco collection hopper, the conveying cylinder, the air hole array, the air chambers, the first positive pressure control solenoid valve, the second positive pressure control solenoid valve, the negative pressure control solenoid valve, the industrial computer, a data cable, a programmable logic controller (PLC) control cabinet, the foreign object-containing shredded tobacco elimination trigger line, the qualified shredded tobacco unloading trigger line, the residual shredded tobacco clearing trigger line, the foreign object collection container, the qualified shredded tobacco collection container, the residual shredded tobacco collection container, a high-pressure air bag with an air pressure of P1, a high-pressure air bag with an air pressure of P2, a vacuum air bag, the position trigger, and a solenoid valve control panel;

the regulating valve is disposed at a bottom opening of the hopper and is used for controlling a material flow rate;

the hopper is located above the horizontal conveyor belt, so that materials flow out of the hopper and fall onto the horizontal conveyor belt; a motor is disposed on one side of the horizontal conveyor belt, an output shaft of the motor is connected to a driving wheel of the horizontal conveyor belt, and the motor is used for driving the horizontal conveyor belt to move;

the thin-layer thickness adjustment roller, the shredded tobacco elimination roller, and the super-thick shredded tobacco collection hopper are sequentially arranged above the horizontal conveyor belt; the shredded tobacco exceeding a set thickness is removed by the thin-layer thickness adjustment roller from the horizontal conveyor belt and is then conveyed by the shredded tobacco elimination roller into the super-thick shredded tobacco collection hopper;

the thin-layer thickness adjustment roller and the shredded tobacco elimination roller are each provided with a motor, an output shaft of the motor of each of the thin-layer thickness adjustment roller and the shredded tobacco elimination roller is connected to a driving wheel of the roller, and the motor is used for driving the roller to move;

the conveying cylinder is in butt joint with the far end of the horizontal conveyor belt, and shredded tobacco falls from the far end of the horizontal conveyor belt onto the surface of the conveying cylinder; the position trigger for determining rotation positions of the conveying cylinder is disposed at the joint between the conveying cylinder and the horizontal conveyor belt and is electrically connected to the industrial computer;

the conveying cylinder is provided with a motor, an output shaft of the motor of the conveying cylinder is connected to a driving wheel of the conveying cylinder, and the motor is used for driving the conveying cylinder to move; the air hole array is disposed on an outer layer of the surface of the conveying cylinder, and a bottom side of the air hole array is in communication with the air chambers;

each of the air chambers is electrically connected to the first positive pressure control solenoid valve, the second positive pressure control solenoid valve, and the negative pressure control solenoid valve; the first positive pressure control solenoid valve is electrically connected to the high-pressure air bag with an air pressure of P1, the second positive pressure control solenoid valve is electrically connected to the high-pressure air bag with an air pressure of P2, and the negative pressure control solenoid valve is electrically connected to the vacuum air bag;

the airflow nozzle array is located above the conveying cylinder, and the loose shredded tobacco collection hopper is disposed below an airflow direction, so that the tangential airflows from the airflow nozzle array blow loose shredded tobacco on the surface of the thin layer of shredded tobacco on the conveying cylinder into the loose shredded tobacco collection hopper;

the LED linear array light source is located above the conveying cylinder; the LED linear array light source consists of N groups of LED lamp beads, and an $i^{th}$ group comprises E LED lamp beads capable of emitting light with a wavelength of λ_i, wherein E is an integer greater than or equal to 1;

the line-scanning camera is disposed above the conveying cylinder; the line-scanning camera has a line-scanning width of W, and the line-scanning camera is used for capturing an image of the thin layer of shredded tobacco in the line-scanning area;

the foreign object collection container, the qualified shredded tobacco collection container, and the residual shredded tobacco collection container are sequentially disposed along a rotation direction of the conveying cylinder;

the foreign object-containing shredded tobacco elimination trigger line is located above the foreign object collection container; when the area containing foreign objects is above the foreign object collection container and the center line of the area coincides with the foreign object-containing shredded tobacco elimination trigger line, the position trigger transmits a signal to the industrial computer, and the industrial computer judges the signal and controls the solenoid valves to be opened or closed via the solenoid valve control panel in the PLC control cabinet, so that the shredded tobacco containing foreign objects falls from the surface of the conveying cylinder into the foreign object collection container due to change of the air chamber;

the qualified shredded tobacco unloading trigger line is located above the qualified shredded tobacco collection container; when the area containing qualified shredded tobacco is above the qualified shredded tobacco collection container and the center line of the area coincides with the qualified shredded tobacco unloading trigger line, the position trigger transmits a signal to the industrial computer, and the industrial computer judges the signal and controls the solenoid valves to be opened or closed via the solenoid valve control panel in the PLC control cabinet, so that the qualified shredded tobacco falls from the surface of the conveying cylinder into the qualified shredded tobacco collection container due to change of the air chamber;

the residual shredded tobacco clearing trigger line is located above the residual shredded tobacco collection container; when the area containing residual shredded tobacco is above the residual shredded tobacco collection container and the center line of the area coincides with the residual shredded tobacco clearing trigger line, the position trigger transmits a signal to the industrial computer, and the industrial computer judges the signal and controls the solenoid valves to be opened or closed via the solenoid valve control panel in the PLC control cabinet, so that the residual shredded tobacco falls from the surface of the conveying cylinder into the residual shredded tobacco collection container due to change of the air chamber;

the solenoid valve control panel is disposed in the PLC control cabinet; the solenoid valve control panel is electrically connected to the industrial computer, the first positive pressure control solenoid valve, the second positive pressure control solenoid valve, and the negative pressure control solenoid valve; the solenoid valve control panel receives a feedback signal from the industrial computer and controls the first positive pressure control solenoid valve, the second positive pressure control solenoid valve, and the negative pressure control solenoid valve to be opened or closed;

the PLC control cabinet controls the airflow nozzle array to be opened or closed;

the industrial computer is electrically connected to the position trigger and receives and processes material position information collected by the position trigger;

the industrial computer is electrically connected to the line-scanning camera and receives and processes spectral information collected by the line-scanning camera;

normal data processing programs, standard databases, and processing modules are built in the industrial computer, and are used for performing data processing on the spectral information of shredded tobacco and plastic foreign objects with low chromaticity difference to identify the plastic foreign objects with low chromaticity difference.

7. The device according to claim 6, wherein the thin-layer thickness adjustment roller and the shredded tobacco elimination roller both rotate clockwise; spike teeth are provided on surfaces of the thin-layer thickness adjustment roller and the shredded tobacco elimination roller, and the spike teeth on the shredded tobacco elimination roller are distributed in a staggered manner with the spike teeth on the thin-layer thickness adjustment roller; the spike teeth on the thin-layer thickness adjustment roller and the shredded tobacco elimination roller are bow teeth and have adjustable lengths.

8. The device according to claim 6, wherein each group of the LEDs alone emit light uniformly irradiated onto the line-scanning area on the surface of the conveying cylinder; each of the air chambers is corresponding to the air hole array containing 1-40 air holes.

9. The device according to claim 6, wherein the airflow nozzle array is located above the butt joint between the conveying cylinder and the far end of the horizontal conveyor belt, and the airflow direction of the airflow nozzle array is the same as and is tangential to the rotation direction of the conveying cylinder; the airflow nozzle array and the line-scanning camera are sequentially arranged along the movement direction of the conveying cylinder.

10. The device according to claim 6, wherein the qualified shredded tobacco collection container is arranged directly below the conveying cylinder; opening diameters of the foreign object collection container, the qualified shredded tobacco collection container, and the residual shredded tobacco collection container are 2-10 times a length of the area to be judged; the foreign object-containing shredded tobacco elimination trigger line, the qualified shredded tobacco unloading trigger line, and the residual shredded tobacco clearing trigger line are located directly above the foreign object collection container, the qualified shredded tobacco collection container, and the residual shredded tobacco collection container, respectively.

* * * * *